Jan. 14, 1958     E. KOPPL     2,819,877
SAFETY JOINT AND JARRING TOOL
Filed May 20, 1954     5 Sheets-Sheet 1
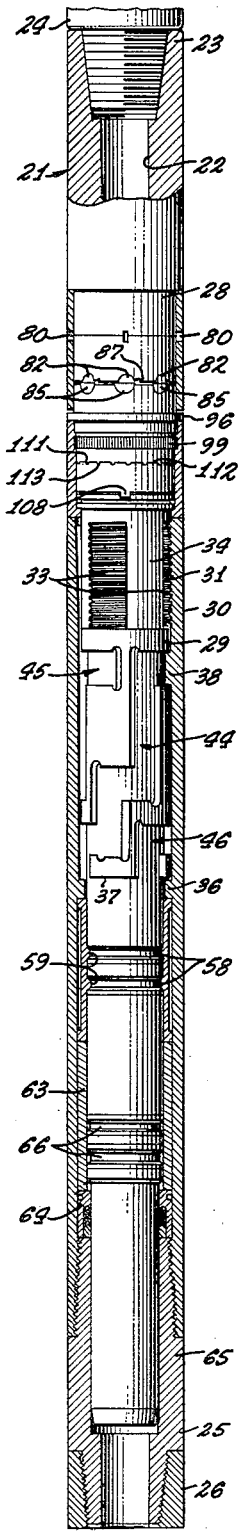
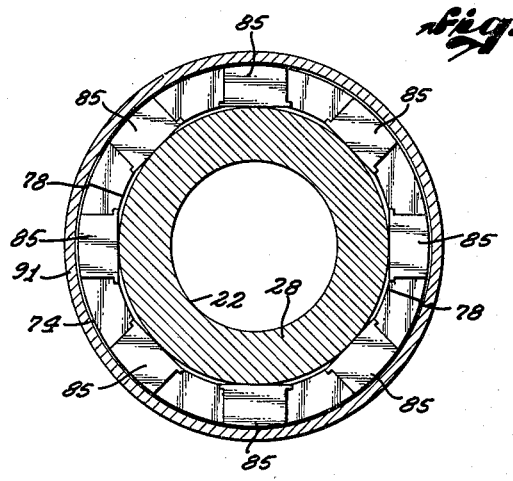
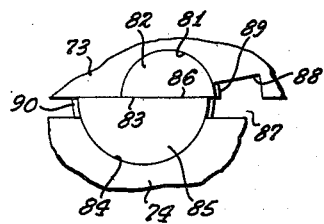
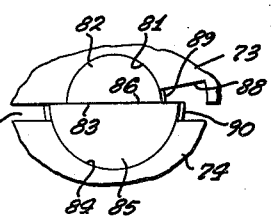
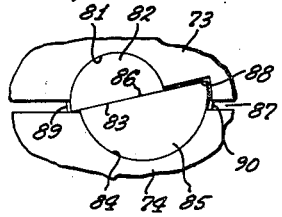
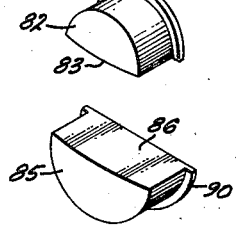
ERNEST KOPPL,
INVENTOR.
HUEBNER, BEEHLER,
WORREL & HERZIG,
ATTORNEYS.
BY Jan. 14, 1958  E. KOPPL  2,819,877
SAFETY JOINT AND JARRING TOOL
Filed May 20, 1954  5 Sheets-Sheet 2
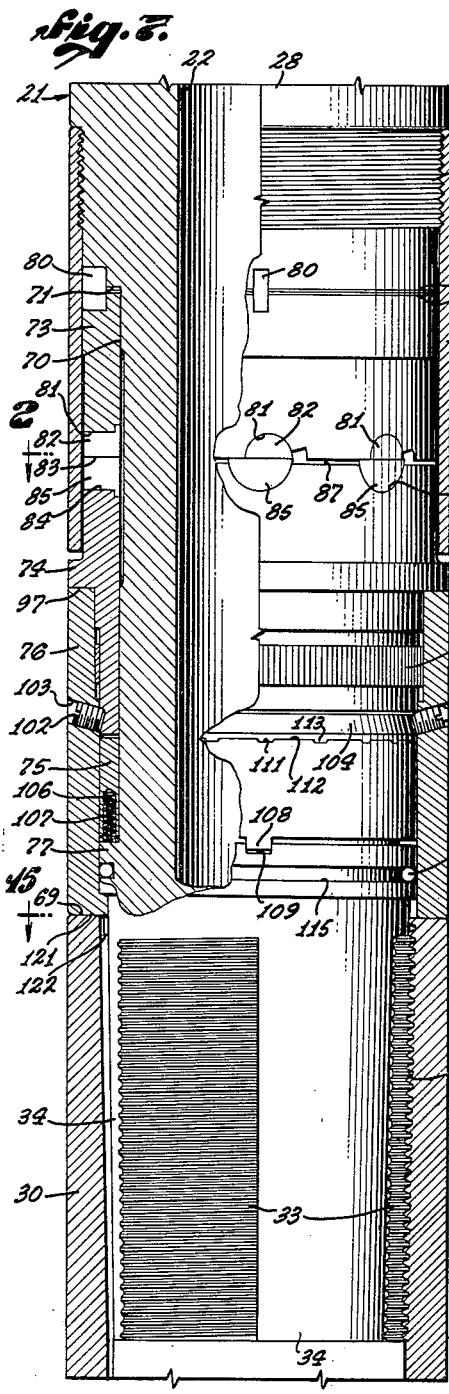
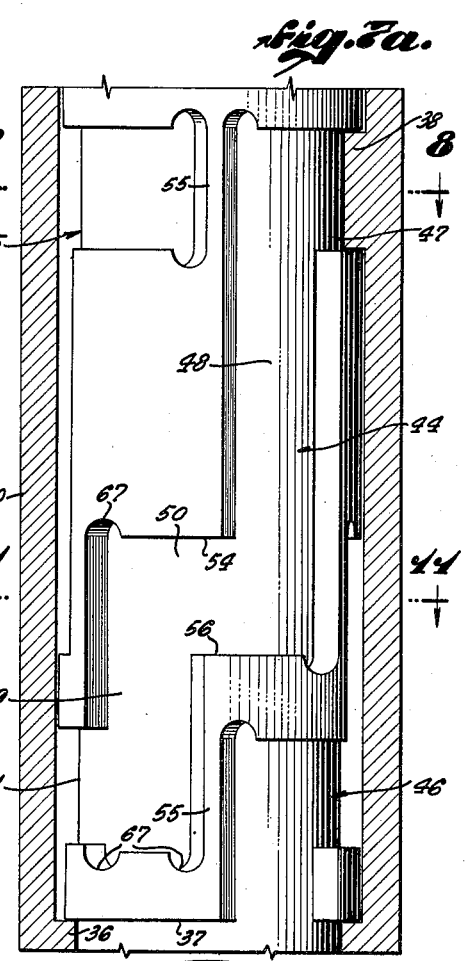
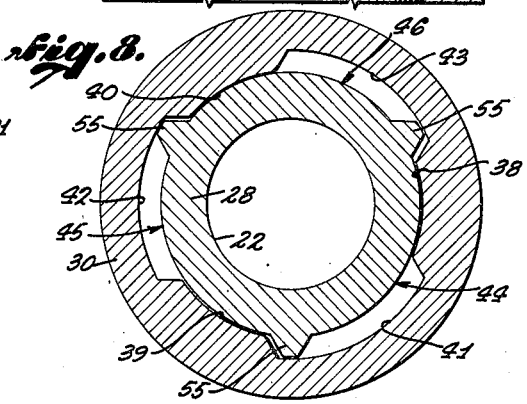
ERNEST KOPPL,
INVENTOR.
HUEBNER, BEEHLER,
WORREL & HERZIG,
ATTORNEYS.
BY Jan. 14, 1958 E. KOPPL 2,819,877
SAFETY JOINT AND JARRING TOOL
Filed May 20, 1954 5 Sheets-Sheet 3
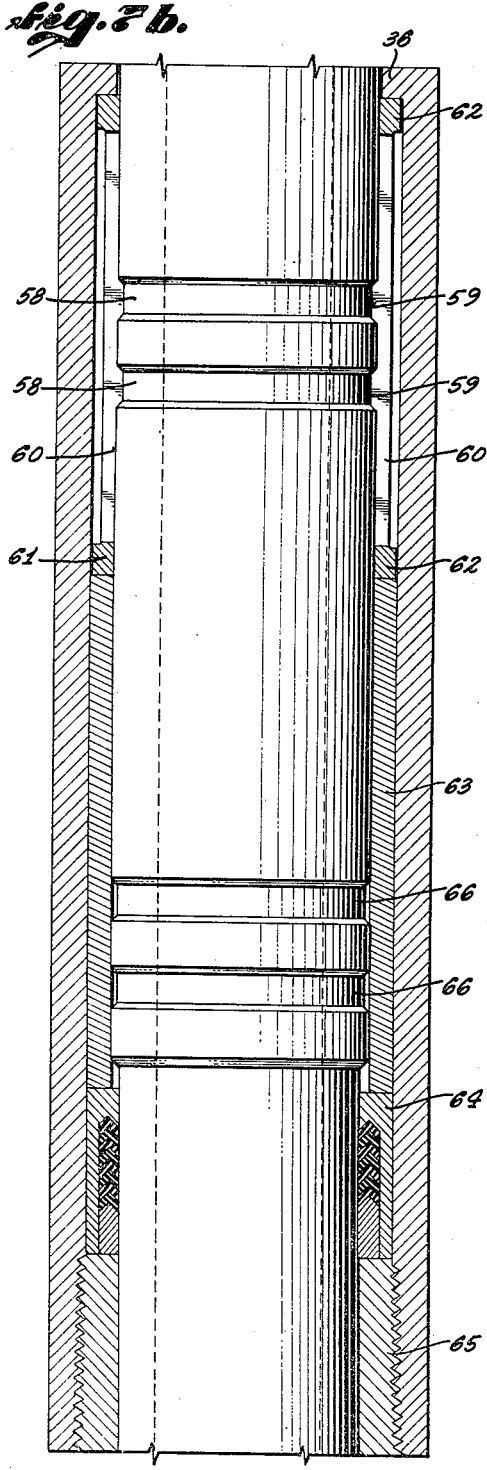
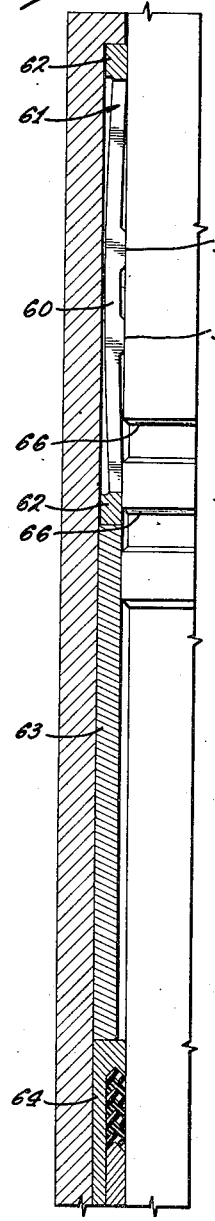
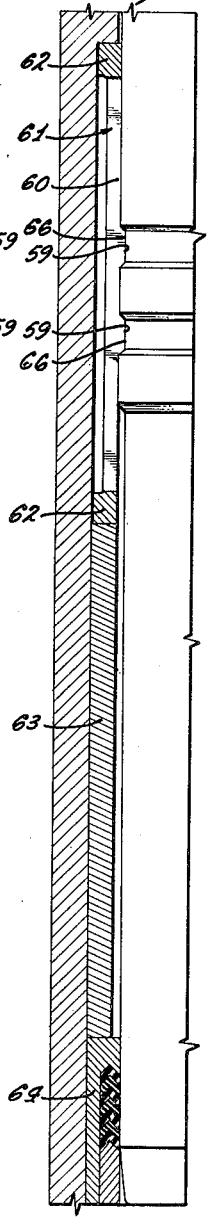
ERNEST KOPPL,
INVENTOR.
HUEBNER, BEEHLER,
WORREL & HERZIG,
ATTORNEYS.

Jan. 14, 1958 E. KOPPL 2,819,877
SAFETY JOINT AND JARRING TOOL
Filed May 20, 1954 5 Sheets-Sheet 4

ERNEST KOPPL,
INVENTOR.

HUEBNER, BEEHLER,
WORREL & HERZIG,
ATTORNEYS.
BY

Jan. 14, 1958

E. KOPPL 2,819,877

SAFETY JOINT AND JARRING TOOL

Filed May 20, 1954

ERNEST KOPPL,
INVENTOR.

HUEBNER, BEEHLER,
WORREL & HERZIG,
ATTORNEYS.

BY

United States Patent Office 2,819,877
Patented Jan. 14, 1958

2,819,877

SAFETY JOINT AND JARRING TOOL

Ernest Koppl, Huntington Park, Calif., assignor to Tripod Oil Tool Co., Los Angeles, Calif., a corporation of California Application May 20, 1954, Serial No. 431,066

9 Claims. (Cl. 255—27)

This invention relates to improvements in releasable joints for connecting sections of rods, pipes and the like, and in jarring tools for use in well drilling and other well operations.

It is an object of this invention to provide a construction for a joint for interconnecting pipes, rods and the like which is adapted to be made loose by the application thereto of a torque of predetermined value applied in a direction tending to tighten the joint.

Another object of the invention is to provide a joint construction of the above mentioned character which is adapted to be reset for joint tightening upon the application thereto of a torque applied in a direction tending to loosen the joint.

Another object of the invention is to provide a safety joint and jar tool for use in well operations such that should a well string or the like containing the tool become stuck in a well the joint may be disconnected and the jar operated to release the stuck string, and upon completion of the jarring operation the component parts of the joint will be in reset position permitting continuation of the well operations without requiring withdrawal of the string from the well.

A further object is to provide a safety joint and jar tool for use in well operations such that should a well string become stuck in a well, the jar may be operated to release the stuck string and upon failure to release the string, the tool may be disconnected from the stuck part of the string and retrieved.

Another object of the invention is to provide an improved jar means in a well tool for upwardly and downwardly jarring a well string, casing, tubing, etc., loose from a place where such string, casing, tubing, etc. has become stuck in a well.

A further object of the invention is to provide a jarring tool having means retaining the relatively movable parts thereof in engagement such that the circulation of drilling fluids and the like through the tool may be continued during jarring operations.

Further objects and advantages of the invention will appear during the course of the following part of this specification wherein the details of construction and mode of operation of a preferred form of the invention are described with reference to the accompanying drawings, in which:

Fig. 1 is an elevation, partly in central vertical section, of a well tool embodying the invention;

Fig. 2 is a cross section taken upon line 2—2 of Fig. 7;

Figs. 3, 4 and 5 are detail elevations of contractible devices for the well tool shown in several operating positions;

Fig. 6 is an exploded perspective view of a contractible device used in the well tool;

Figs. 7, 7a and 7b are vertical sections on an enlarged scale of a top portion, middle portion, and lower portion, respectively, of the well tool;

Fig. 8 is a cross section of the well tool taken substantially on line 8—8 of Fig. 7a;

Figs. 9 and 10 are vertical sections through a portion of the well tool showing the parts thereof in different relative positions;

Fig. 11 is a cross section taken substantially on line 11—11 of Fig. 7a;

Figure 15:
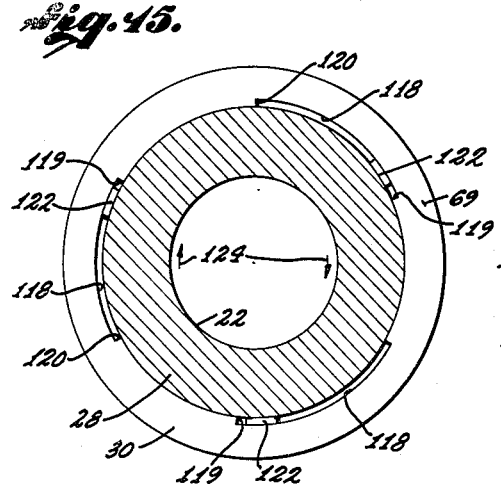
Figure 16:
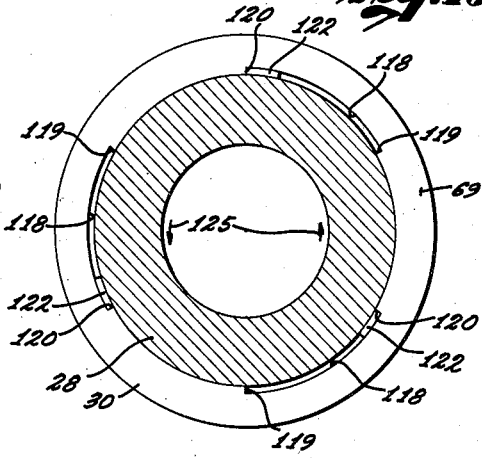
Figure 17:
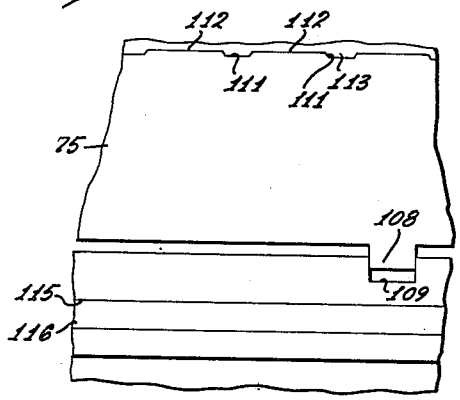
Figure 18:
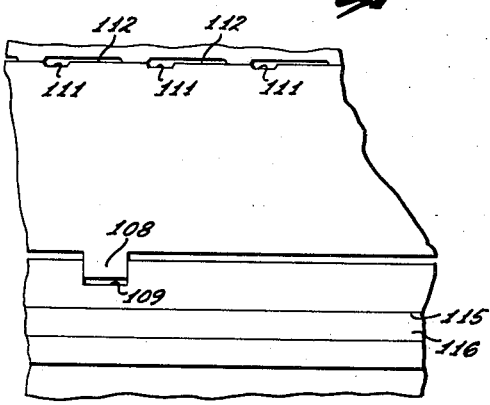

Figs. 15 and 16 are cross sections taken substantially on line 15—15 of Fig. 7 and showing the parts of the tool in different operating positions; and Figs. 17 and 18 are elevations of a portion of the well tool shown in different operating positions.

For purposes of illustration the invention is shown in the form of a section 21 of a drill string having an axial bore 22 extending therethrough for conveying drilling fluid or for passing tools and the like down in the drill string during drilling operations. At its top end 23 the section 21 is internally threaded for connecting it to a drill string section 24, and at its lower end 25 the section 21 is externally threaded for connecting to a drill string section 26. The threads for the connections or joints of the sections are uni-directional, i. e., they are all either right-hand threads or all left-hand threads, whereby the joints of the drill string tend to become tight when the string is rotated in one direction, as for drilling, and are susceptible to becoming loose or disconnected when a strong torque is applied to the string in an opposite direction. For convenience in description, it is assumed herein that the threads for forming the section joints are all right hand threads.

The drill string section 21 constitutes a well tool embodying the invention, and it comprises a male member 28 having a tubular mandrel or stem 29 received in a tubular female member 30 forming the lower part of the well tool. Near the top end of the female member and projecting inwardly from the inner wall thereof, is a series of circumferentially spaced and axially directed raised threaded portions 31 having spaces between adjacent threaded portions forming a separated or interrupted screw thread. Around the neck of the stem 29 is a series of circumferentially arranged raised threaded portions 33 having spaces 34 between adjacent threaded portions forming an interrupted screw thread adapted to engage the interrupted screw thread on the female member. The arcuate dimension or width of the threaded portions 31 and 33 is slightly less than that of the spaces between threaded portions. Thus the male and the female members may be interconnected by inserting the stem 29 into the bore of the female member with the threaded portions of the stem in registry with the spaces between the threaded portions of the female member, and then rotating the male member within the female member to interengage the threads.

Spaced below the interrupted threads 31 on the female member and projecting inwardly from the inner surface thereof is an annular shoulder 36. Below a line, designated by reference numeral 37, the stem 29 is of reduced external diameter so that it may be passed into the female member and extend below the shoulder 36. Between the shoulder and the interrupted thread 31 of the female member and projecting inwardly from the inside surface of the female member are three circumferentially spaced apart anvil elements 38, 39 and 40, providing arcuate spaces 41, 42 and 43 between them. The anvil elements extend into tortuous channels 44, 45 and 46, respectively, formed in the outer surface of the upper portion of the stem and arranged to permit axial movement of the stem in the female member for effecting a jarring of the drill string as will presently appear. These channels are best shown in Figures 7a, 8, and 11 to 14 inclusive. Each channel is similar to the others in shape.

Figure 13:
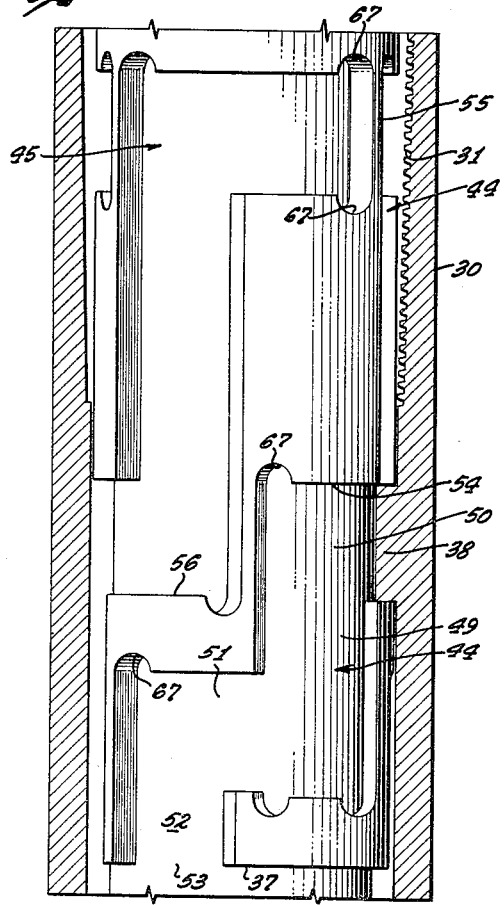
Figs. 13 and 14 are central vertical sections through that portion of the well tool shown in Fig. 7a, but showing the parts of the tool arranged in different relative positions.
Figure 14:
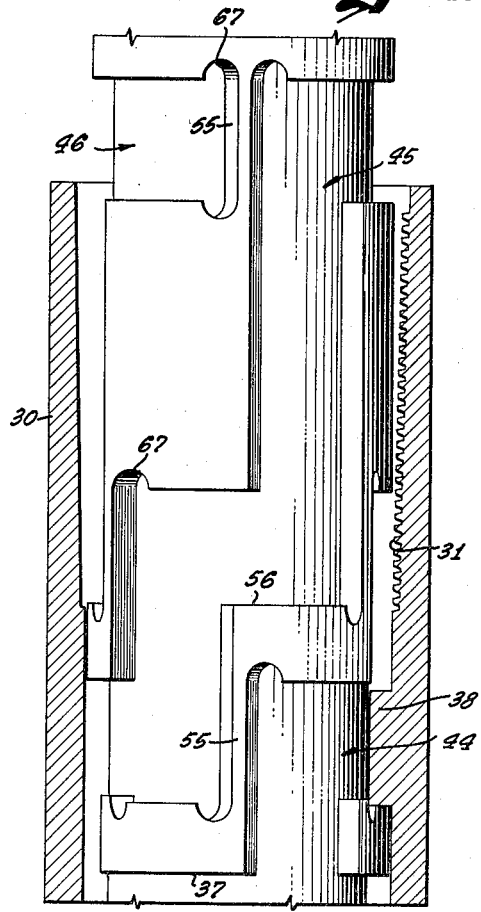
Figure 12:
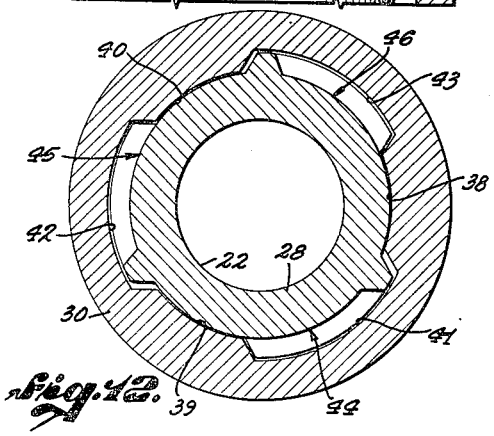
Fig. 12 is a cross section similar to that of Fig. 11 but showing the parts of the well tool in a different relative position.
Figure 14A:
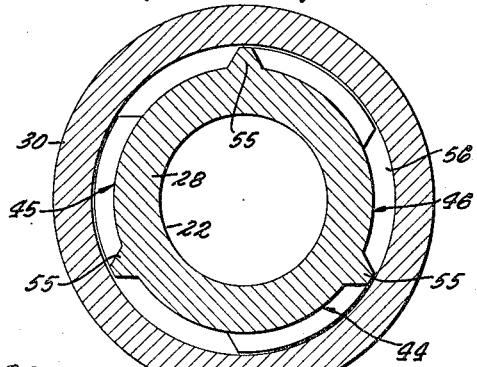

Referring to Figure 7a, wherein a large portion of the channel 44 appears, it is seen that each channel has a horizontal portion 47 extending laterally from the top of a longitudinally arranged portion 48 which in turn is in communication with another longitudinal portion 49 through a horizontal leg or connecting portion 50 arranged between the lower end of portion 48 and the top end of portion 49. In Figure 13 the remaining part of channel 44 appears, and it has a horizontal leg portion 51 joining the lower end of the portion 49 to the top of a lowermost portion 52, which in turn is open at its lower end, as designated by numeral 53, for admitting an anvil element into the channel when the male member is being fitted into the female member. Thus each channel extends in a step-wise manner around a substantial part of the stem. To fit the stem into the female member, it is necessary to align openings 53 at the lower end of each channel with the anvil elements, thus permitting the stem to be moved axially into the female member until the top end surfaces of the anvil elements strike against the top end surfaces of channel portions 52. The stem is then rotated in a right hand (clockwise) direction in the female member to bring the longitudinal portions 49 into registry with the anvil elements permitting further axial movement of the stem into the female member. The stem is then moved further into the female member until the anvil elements strike against the top end surfaces 54 of portions 49 whereupon the stem must again be rotated clockwise in order to align the longitudinal portions 48 with the anvil elements. The channels are so arranged on the stem that the longitudinal portions 48 will be in registry with the anvil elements when the interrupted threads 33 on the neck of the stem are in registry with the spaces 34 beween the interrupted threads 31 of the female member, thus permitting the stem to be moved into the female member prior to engagement of the threads. Turning of the stem in the female member to engage the threads is made possible by the longitudinal portions 47 of the channels which receive the anvil elements when the above mentioned engagement of threads is effected. Lands 55 define the ends of the longitudinal portions 47 and these limit the extent of rotation of the male member in the female member. The top end surfaces 54 of the channel portions 49 and lower end surfaces 56 of the channel portions 48 constitute hammer surfaces for striking against the anvil elements as will presently appear.

Below the line 37, the stem is provided with two annular grooves 58 formed in its outer surface. These grooves have their side walls beveled outwardly so that the openings of the grooves are wider than the bottoms. They are located at places on the stem such that when the stem is received fully in the female member the grooves will be engaged by inwardly extending catches 59 on a plurality of spring leaves 60 of a cage 61. The cage includes two end rings 62, one of which is integral with the upper ends of the spring leaves, and the other with the lower ends of the spring leaves. In practice the cage is formed of sufficient strength to require an upward or downward force of approximately 15 tons on the stem in order to cause the spring leaves 60 to be bowed outwardly for releasing the engagement of the catches 59 with the stem grooves.

Upward axial movement of the cage 61 in the bore of the female member is prevented by the annular shoulder 36 against which the top ring of the cage abuts. Spacing sleeves 63 and 64 below the cage keep it from sliding down in the bore of the female member, and these spacing sleeves are in turn retained in the bore by a tubular plug 65 forming the lower end of the female member, i. e., constituting the lower end of the drill string section 21.

Below the grooves 58 is another set of annular grooves 66 so located that they will be engaged by the catches 59 of the spring cage 61 when the stem is withdrawn from the female member by a distance sufficient to allow the anvil elements 38, 39 and 40 to strike against the lower end surfaces or hammer surfaces of the longitudinal portions 49 of the stem channels. The corners of the longitudinal portions of the channels are preferably recessed, as shown at 67, to receive any dirt or sand particles that may fall on the hammer surfaces of the channels, thus providing for flush engagement between anvil and hammer surfaces.

*Operation of jarring mechanism*

In operation of the well tool as thus far described, the parts of the tool are in the relative position shown in Figures 1, 7, 7a and 7b when the drill string is being rotated as for drilling. Now let it be assumed that the string has become stuck at a place (not shown) below the well tool 21. In many instances a stuck drill string may be jarred loose and drilling operations continued without having to withdraw the string from the well. In the present case when the string has become stuck, the operations for disconnecting the male and female members include rotation of the upper end of the string in a direction opposite to that employed for drilling to thereby disengage the interrupted threads 31 and 33 and to position the anvil elements 38, 39 and 40 in the longitudinal portions 48 of channels 44, 45 and 46, respectively, whereupon, except for engagement of the catches on the spring cage 61 with the annular grooves 58, the stem is free to be moved upwardly from the female member. A strong upward pull is then applied to the drill string and when the force of such upward pull exceeds the resistance offered by the cage 61 against the grooves 58 (e. g. 15 tons) the engagement of the cage and grooves will be broken thus causing the stem to be jerked upwardly from the female member and the hammer surfaces 56 will strike hard against the anvil elements. This striking of the hammer surfaces against the anvil elements imparts a severe up-jar on the drill string, and in many cases such up-jar is sufficient to loosen the drill string from its stuck point. The parts of the tool are in the relative position shown in Figures 9 and 13 immediately following an up-jar operation.

Should the up-jar as just described or repeated up-jars fail to release the stuck drill stem, the tool may then be jarred downwardly. To effect a jar downwardly on the stuck drill stem, it is again turned in a left hand direction to rotate the stem and bring the longitudinal portions 49 of the channels into registry with the anvil elements 38, 39 and 40. It is to be noted that the longitudinal portions 48 of the channels are of a length that is sufficient to cause the interrupted stem threads 33 to be positioned above the threads 31 of the female member when the anvil elements are in engagement with the hammer surfaces 56, thus allowing relative movement of the anvil elements in the leg portion 50 of the channels without causing reengagement of the interrupted threads. When the stem has been rotated sufficiently enough to bring the channel portions 49 into registry with the anvil elements, the drill string is then pulled upwardly to locate the anvil elements in the lower part of the channel portions 49 (Figure 14), whereupon the set of grooves 66 becomes positioned adjacent the spring cage 61 and the catches 59 on the cage snap into the grooves 66 and are retained therein as is shown in Figure 10 of the drawing. Upon reaching this relative position of the male and female members, the drill string is stretched and then released, so that the weight and elasticity of the string breaks the engagement of cage and grooves 66, thus causing the stuck part of the string to be jerked downwardly to impart a strong jar to the string when the hammer surfaces 54 strike against the top edges of the anvil elements.

Should repeated up and down jars fail to release the struck drill string, the stem may then be removed entirely from the female member and brought to the top of the well. Removal of the stem from the female member is effected by first rotating the free part of the string to move the lowermost portions 52 of the channels into registry with the anvil elements to permit disengagement of the anvil elements from the channels through channel openings 53. Such removal of the stem from the female member requires that an upward pull be applied to the stem of sufficient force to overcome the resistance (e. g. 15 tons) offered by the interengagement of the grooves 66 and the catches 59 on the spring cage. Thus the well tool of this invention insures retention of the stem in the bore of the female member until a very strong pull of predetermined force is exerted on the stem after the stem has been positioned for release from the female member, whereby there is little, if any, likelihood of accidental disengagement of the stem from the female member. It is to be noted also, that as the stem is retained in the female member throughout the entire period of a jarring operation, which may include both up-jars and down-jars, continued circulation of drilling fluid through the bore of the drill string and down to the drill bit is permitted. Interruption of the circulation of drilling fluid causes the fluid to jell or thicken due to the settling out of suspended matter from the fluid, and thereby causing the bore of the string to become plugged as is well understood by those skilled in the art.

In the above description of the operation of the well tool jarring mechanism, it was pointed out that in order to proceed with a jarring operation it was necessary to disengage the interrupted threads 31 and 32 by rotation of the drill string in a left hand (counterclockwise) direction. It becomes apparent, therefore, that unless otherwise provided for, a left hand turn applied to the drill string is apt to cause the string to become disconnected at a joint therein other than at the joint formed by the interrupted threads of the male and female members. The present invention provides means for insuring that this disconnection of the drill string will occur only between the male member and the female member of the well tool 21 and not at a section joint in the string. Such means for disconnecting the members of the tool constitutes a safety or quick release joint for the tool.

Safety joint

As viewed broadly, the safety joint of this invention comprises a spacing assembly positioned between facing shoulders on the male member and female member, respectively, and adapted to hold the facing shoulders from moving toward each other so that when the male member is screwed into the female member the members will become wedged tightly against each other. The spacing assembly includes collapsible means which provide for contraction of the spacing assembly when a predetermined torque is applied to the male and female members in a direction tending to tighten the joint. When the spacing assembly is contracted, the threads of the male and female members will be no longer tightly wedged against each other and hence the joint may be easily disconnected by turning either of the members in a direction that will unscrew one from the other.

In the embodiment of the safety or quick-release joint shown in the drawings, end face 69 of the female member around the opening of the bore therein constitutes one shoulder or bearing surface for the joint. The male member 28 has an annular recess 70 formed in its outer surface providing a shoulder or bearing surface 71 facing toward the end face or bearing surface 69 of the female member. The annular recess 70 receives the above referred to spacing assembly which engages each of the bearing surfaces 69 and 71. Such spacing assembly includes a series of rings or sleeves designated by numerals 73, 74, 75 and 76. There is an annular flange 77 around the male member adjacent the stem threads 33, thus requiring that the sleeves 73, 74 and 75 be split along two opposed axially extending lines into half sections, as indicated at 78 in Figure 2 of the drawings, to permit placing of the split sleeves into the recess 70 around the male member.

Rotation of the top sleeve 73 with respect to the male member is prevented by means of keys 80. In its lower end face, sleeve 73 has a series of circumferentially arranged curved recesses 81 for receiving disc segments, which herein constitute half-circular buttons 82, each of which has a flat bearing surface 83 lying in a plane that passes through the chord defining the segment. The top end face of sleeve 74 is similarly provided with a series of curved recesses 84 for receiving half-circular buttons 85 having flat bearing surfaces 86. The radius of each half button 85 is greater than that of the half buttons 82 and the recesses for the respective half buttons are arranged in their respective sleeves in a way such that each half button 82 is slidable on the flat bearing surface of a half button 85. The recesses 84 are of a depth which is less than the radiuses of the half buttons 85 thus causing these half buttons to project upwardly from the top end face of sleeve 74 to maintain adjacent end faces of the sleeves 73 and 74 spaced apart as indicated at 87. Each of the recesses 81 has a notch 88 adjoining it for accommodating an end or corner portion of the half buttons 85 when the sets of buttons are off center, as shown in Figure 5, and as will be explained more fully hereinafter. End flanges 89 and 90 are provided on the inner ends of the half buttons 82 and 85, respectively, for preventing axial movement of the buttons in their recesses. A skirt 91 which is attached to the male member by threads 92 keeps the half sections of split sleeve 73 together in the annular recess 70 and prevents the keys 80 from sliding outwardly from the recesses provided therefor.

Intermediate the ends of sleeve 74 is an annular flange 96 extending outwardly from the outer surface of the sleeve and providing a shoulder or bearing surface 97 facing toward the bearing surface 69 of the female member. Sleeve 76, which extends between the bearing surfaces 69 and 97 and around the lower portion of the sleeve 74, keeps the half sections of split sleeve 74 together and the half section of split sleeve 75 together in the annular recess 70 around the male member.

Split sleeve 74 is maintained non-rotatable with respect to the outer sleeve 76 by means of an annular band 99 integral with the outer surface of the sleeve 74 and having a series of circumferentially arranged and axially directed teeth which mesh with a corresponding ring of teeth formed on the inside face of the sleeve 76. The spaces between adjacent tooth elements on the band 99 are small and the width of each tooth element is likewise small, whereby the relative position of the sleeve 74 in the sleeve 76 may be closely adjusted to properly align the half buttons 85 with half buttons 82, as will be explained fully hereinafter. There is a plurality of set screws 102 in tapped holes 103 formed in the sleeve 76 and these screws are engageable with a wall of an annular groove 104 around the lower end of sleeve 74 for holding the sleeve 76 on the sleeve 74 and preventing sleeve 76 from sliding off the end of the male member when the male member is disconnected and lifted from the female member.

Sleeve 75 is provided with a plurality of bores 106 extending upwardly from the lower end face of the sleeve. These bores receive coil springs 107 which engage the upwardly facing shoulder provided by flange 77 and thereby urge the sleeve 75 upwardly from the flange. To prevent sliding of the ends of the springs on the shoulder of the flange, the sleeve 75 is held non-rotatable on the male member by means of a plurality of lugs 108 depending from the lower end face of the sleeve and movable upwardly and downwardly in slots 109 formed in the flange 77.

As best shown in Figs. 17 and 18 of the drawing, the upper end face of split sleeve 75 is provided with a series of circumferentially arranged and radially directed recesses 111 defining lands 112 between adjacent recesses.

These recesses are adapted to mesh with cogs 113 extending from the lower end face of sleeve 74, as will be explained more fully hereinafter.

Flange 77 has an annular groove 115 formed in its outer surface for receiving an O-ring 116 which provides a seal against entry of foreign matter within the sleeve 76.

Referring to Figures 15 and 16 of the drawings it is seen that the female member is provided with three arcuate recesses or slots 118 formed in the rim defining the opening of its axial bore. These slots are spaced apart equally around the inner rim of the female member, thus defining shoulders 119 and 120 at the ends of each slot to provide stop means for limiting the extent of rotation of sleeve 76 as will presently appear. Integral with the sleeve 76 on its inside face, and extending downwardly beyond lower end face 121 of the sleeve 76 so as to be received in the slots 118 are three keys 122. The width of these keys is such that the keys will be moved from engagement with one of the shoulders 119 and 120 of their respective slots 118 and into engagement with the other of these shoulders when the sleeve 76 is rotated approximately one-twelfth of a complete turn with respect to the female member.

*Operation of safety joint*

Let it be assumed that the drill string is being rotated in a well in a right hand direction, as indicated by arrows 124 in Fig. 15, for drilling purposes by means of a rotary power source (not shown) located at the top of the well. Assume, too, that the power source is set to apply a torque to the drill string not in excess of 12,000 ft. lbs., i. e., the normal upper limit for torque required during drilling operations. Under these conditions, the several parts of the safety joint will be in a position which is herein referred to as a running position for the tool. In its running position the half buttons 82 and 85 will be in the positions shown in Fig. 3 of the drawing. For usual drilling operations the parts of the well tool are adjusted so that release of the joint will not occur until a right hand torque of about 15,000 ft. lbs. is applied to the drill string.

Now let it be assumed that the drill string has become stuck in the well at a place below the well tool and that the upper limit of torque at which the power source is set (12,000 ft. lbs.) is insufficient to overcome the resistance developed at the stuck point. Under such conditions a jarring operation will be required in order to release the drill string from its stuck point.

To proceed with a jarring operation which requires disengagement of the male member from the female member, an operator resets his power source so that it will apply increased torque up to 15,000 ft. lbs. to the drill string. Increasing the torque on the drill string causes slight turning of the male member in the female member so as to further tighten the threads 31 in the threads 33 resulting in slight movement of shoulder 71 on the male member toward the end face 69 on the female member, thereby developing increased pressure of end face 121 of sleeve 76 against end face 69. The pressure already existing between surfaces 121 and 69 causes the sleeve 76 to be frictionally held against rotation thereof with respect to the female member. Since the sleeve 74 is held non-rotatable in the sleeve 76 by means of the toothed band 99, sleeve 74 will also be held non-rotatable with respect to the female member. With the sleeve 73 being held non-rotatable on the male member by the keys 80, the slight turning of the male member in the female member will cause relative movement between the half-buttons 82 and 85 and when a torque of about 15,000 lbs. is reached the buttons will have become centered, as shown in Fig. 4. In this position the lands 55 on the stem of the male member will be in the relative positions shown in Fig. 8 wherein the lands are spaced slightly from the anvil elements 38, 39 and 40 permitting further clockwise rotation of the male member in the female member.

Upon reaching the joint releasing torque of 15,000 ft. lbs., the centers of the half buttons 82 will be moved slightly past the centers of the half-buttons 85 and because of the pressure being transmitted to sleeve 74 urging it upwardly toward sleeve 73, each set of half buttons will be caused to rotate in their respective recesses and the right hand corners of the half buttons 85, as viewed in Fig. 5, will move upwardly into their respective notches 88. Such rotation of the sets of half-buttons allows the sleeve 74 to move upwardly toward the sleeve 73, thereby reducing the space 87 between the sleeves and releasing the pressure of end face 121 against end face 69. When the sets of half buttons are in the position shown in Fig. 5 the parts of the joint are in a position which is herein referred to as a release position for the joint. With release of pressure between end faces 69 and 121 the pressure of threads 31 in the threads 33 becomes released whereby the male member is no longer held tightly in the female member and the threads 31 and 33 may be disengaged easily by merely turning the male member in a counterclockwise direction (indicated by arrows 125 in Fig. 16) which will unscrew the male member from the female member.

In the joint release position, the lands 55 on the stem of the male member are in engagement with the anvil elements on the female member whereby the lands and the anvil elements constitute a stop means for the joint, preventing rotation of the male member in a clockwise direction beyond a predetermined position. This limiting of the extent of rotation of the male member prevents the half-buttons 85 from engaging the arcuate walls of the notches 88 thus keeping the sliding surfaces of these half-buttons free from possible damage. Such stop means also assists in keeping the parts of the safety joint from being moved relative to each other beyond a position where they can be reset in running position by operations performed at the top of the well. It is to be noted, too, that by the time the sets of half-buttons become positioned in their joint release position the keys 122 will be in engagement with shoulders 119 of their respective slots 118.

Referring again to the running position for the component parts of the safety joint, it is to be noted that like the sleeve 73, the sleeve 75 is non-rotatable with respect to the male member. Thus when the male member is turned by the application thereto of increased torque which will move the parts of the joint from their running positions to their release positions, the sleeve 75 is rotated with respect to the sleeve 74 whereby the sleeve 75 will be urged downwardly against the pressure of springs 107 and the cogs 113 will become disengaged from recesses 111 thereby positioning the lands 112 under and in engagement with the cogs 113, as shown in Fig. 18.

When the parts of the safety joint have been moved to their release positions, the male member may be rotated easily in a left hand direction, indicated by arrows 125 in Fig. 16, for disconnecting the male member from the female member preparatory to performing a jarring operation as previously described. In most cases a jarring operation will prove successful in causing release of the drill string from its stuck point. It is desirable, therefore, that the safety joint be capable of being reset to a running position while the well tool is down in the well so that drilling operations may be continued without requiring withdrawal of the safety joint from the well. The safety joint of this invention is adapted to become reset to its running position upon counterclockwise rotation of the male member for disengaging the threads 31 and 33.

As the male member is rotated in the direction of arrows 125, it will turn the sleeves 73 and 75 along with it. Sliding of the lands 112 of sleeve 75 under the cogs 113 of sleeve 74 during joint releasing operations causes contraction of the springs 107 which increases the pressure of sleeve 75 against sleeve 74 and the frictional engagement between the sleeves thereby causes sleeves 74 and 76 to be rotated in a left hand direction along with the sleeve 75. Rotation of sleeve 76 in a left hand direction brings the keys 122 into engagement with shoulders 120 of slots 118 in the female member, as is shown in Fig. 16 of the drawing. Since engagement of the keys 122 and shoulders 120 occurs in about one-twelfth of a turn of the male member in the female member, sleeves 76 and 75 will be held against continued counterclockwise rotation by the time threads 31 have been moved about one-half of the turn needed to effect disengagement thereof from threads 33. Thus as counterclockwise rotation of the male member is continued the now stationary sleeves 76 and 75 will cause the half-buttons 82 to slide back over the half-buttons 85 to their running position shown in Fig. 3, and cogs 113 will again become meshed with recesses 111. Thus by the time the male member has been rotated sufficiently to complete the disengagement of threads 33 from threads 31, the component parts of the safety joint have become reset to their running positions, whereby drilling operations may be continued immediately following a successful jarring operation.

From the above it is apparent that the relative size of the component parts of the safety joint determines the torque needed to cause release of the joint. With a joint having its parts constructed to require application of 15,000 ft. lbs. torque for release and should it be desired to effect release at a lesser torque, shims 127 may be inserted between shoulder 71 and the top end face of sleeve 73, thereby increasing the effective axial length of the sleeve assembly which results in release of the joint at a lesser torque.

In the above explanation of the actions of the several parts of the safety joint during a joint release operation, such actions are described in a step-wise manner for the purposes of adding clarity thereto. It is important to note, however, that in practice the release of pressure between the threads on the male and female members occurring during a joint release operation is relatively quick. Immediately prior to joint release, the component parts of the joint are under great pressures and these pressures are released practically instantaneously following the application to the well string of the predetermined release torque. Such release of pressure is expended in the striking of the lands 55 against the anvil members 38, 39 and 40 with a great force. Thus it is apparent that the female member will be subjected to a strong impact when the joint is released and such impact imparts a severe jar to the stuck string which may in some cases be sufficient to cause release of the well string at its stuck point.

Should the safety joint become released as a result, for example, of an inadvertent or accidental application to the well string of sufficient torque to cause release, the effects of such release will be apparent to an operator at the top of the well and under such conditions the joint may be easily reset to its running position by merely applying a back turn to the well string to bring the half buttons on the joint back to their running positions.

It is understood that the form of my invention herein shown and described is a practical and preferred embodiment of the same, and that changes may be resorted to within the scope of my invention which is not limited to the details disclosed but is to be accorded the full scope of the claims so as to embrace any and all equivalent structures.

What I claim is:

1. A releasable joint construction comprising an externally threaded male member, an internally threaded female member fitted to the male member, means forming a shoulder on the female member, means forming a shoulder on the male member spaced from and facing toward the shoulder on the female member, a spacing assembly between and in engagement with the shoulders, said assembly including a pair of adjacent sleeves coaxial with the male member and arranged in end to end relation whereby they present facing end surfaces, one of said sleeves being rotatable with respect to the other sleeve, each of said surfaces having a plurality of circumferentially spaced curved recesses formed therein with the axis of each recess being radially directed with respect to the sleeves, a plurality of segments of circular disks, each of said recesses containing a disk segment, said sleeves being arranged so that the disk segments in one sleeve are in engagement with the segments in the other sleeve whereby contacting segments constitute a plurality of sets, one segment of each set being of larger radius than the other segment thereof.

2. A joint construction according to claim 1 wherein each of said members is tubular.

3. A joint construction according to claim 1 in which said female member has a circumferentially extending recess formed therein, said recess being of predetermined length to define inwardly extending shoulders at each end thereof respectively, a key on said rotatable sleeve extending into said recess for limiting rotation of the rotatable sleeve with respect to the female member when the key engages a shoulder of the recess.

4. A well tool comprising an externally threaded tubular male member, an internally threaded female member fitted to the male member, the threads on each of said members being interrupted whereby said members are separable upon disengagement of their threads, contractile means in engagement with each of the members for contraction thereof upon application to the members of a torque of a predetermined value applied in a direction for interengaging the threads on the members respectively whereby upon contraction of the contractile means the threads on the members are no longer tightly wedged against each other in thread engagement position, a tubular stem integral with the male member and extending axially in the female member whereby the outer surface of the stem is adjacent the inside surface of the female member, anvil means on one of said surfaces, a channel formed in the other of said surfaces, said anvil means being in registry with the channel, said channel comprising a plurality of circumferentially spaced apart and axially directed portions providing a plurality of hammer surfaces for striking against said anvil means as the stem is moved axially in the female member.

5. A jarring tool for use in well operations comprising a tubular female member, a tubular stem extending in the female member whereby the outer surface of the stem is adjacent the inside surface of the female member, anvil means on one of said surfaces, a channel formed in the other of said surfaces, said anvil means being in registry with the channel, said channel comprising two circumferentially spaced apart and axially directed portions providing hammer surfaces for striking against said anvil means as the stem is moved axially in the female member, one of said portions extending in an axial direction beyond the other of said portions, a plurality of axially spaced annular grooves formed in the outer surface of the stem, a spring cage around the stem, abutment means on the inside surface of the female member and engageable with the cage for limiting axial movement of the cage in the female member, and a plurality of projections on the cage releasably engageable with said grooves.

6. A releasable joint construction comprising a male member having screw threads formed on the outside surface thereof, a female member having screw threads formed internally thereof to mate with the screw threads of the male member, the male member being threadably moveable in a first axial direction into the female member upon relative rotation of the members with respect to each other, spacing means on one of said members and movable in an axial direction with respect to one of said members, first abutment means on said one member and engageable with the spacing means for limiting movement of the spacing means in an axial direction relative to said one member opposite to the said first axial direction, second abutment means on the other of the members constructed and arranged to engage the spacing means upon movement of the male member into the female member to a predetermined position, said spacing means being subjected to compressive force between the said first and second abutment means upon application to one of the members of a first torque of predetermined value applied for tightening the members in threaded engagement and thereby causing respective threads on the members to become tightly wedged against each other as said value is approached, said spacing means having a predetermined dimension measured between said first and second abutment means, and collapsible means in the spacing means for shortening the said dimension of the spacing means upon application to one of the members of a second torque in excess of said predetermined value and applied in the same direction as the said first torque.

7. A releasable joint construction comprising a male member having screw threads formed on the outside surface thereof, a female member having screw threads formed internally thereof to mate with the screw threads of the male member, the male member being threadably moveable in a first axial direction into the female member upon relative rotation of the members with respect to each other, spacing means on one of said members and movable in an axial direction with respect to one of said members, first abutment means on said one member and engageable with the spacing means for limiting movement of the spacing means in an axial direction relative to said one member opposite to the said first axial direction, second abutment means on the other of the members constructed and arranged to engage the spacing means upon movement of the male member into the female member to a predetermined position, said spacing means being subjected to compressive force between the said first and second abutment means upon application to one of the members of a first torque of predetermined value applied for tightening the members in threaded engagement and thereby causing respective threads on the members to become tightly wedged against each other as said value is approached, said spacing means having a predetermined dimension measured between said first and second abutment means, collapsible means in the spacing means for shortening the said dimension of the spacing means upon application to one of the members of a second torque in excess of said predetermined value and applied in the same direction as the said first torque, and stop means on the members limiting the extent to which the members may be rotated with respect to each other in a screw-thread interengaging direction.

8. A well tool comprising an externally threaded tubular male member, an internally threaded female member fitted to the male member, the threads on each of said members being interrupted whereby said members are separable upon disengagement of their threads, contractile means in engagement with each of the members for contraction thereof upon application to the members of a torque of a predetermined value applied in a direction for interengaging the threads on the members, respectively whereby upon contraction of the contractile means the threads on the members are no longer tightly wedged against each other in thread engagement position, a tubular stem integral with the male member and arranged in the female member, and cooperating well tool jar means on the stem and female member, said jar means constituting stop means for limiting the extent to which the male member is rotatable in the female member in a thread-interengaging direction.

9. A jarring tool for use in well operations comprising an externally threaded elongate male member, an internally threaded elongate female member, the threads on each of said members being mateable and being interrupted along respective longitudinally extending spaces whereby said members are separable from each other when one of the members is rotated with respect to the other to a predetermined position at which the screw threads of said one member are in registry with the longitudinally extending space of the other member, a tubular stem integral with the male member and extending axially in the female member whereby the outer surface of the stem is adjacent the inside surface of the female member, anvil means on one of said surfaces, a channel formed in the other of said surfaces, said anvil means being in registry with the channel, said channel comprising a first longitudinally extending portion in registry with said anvil when said screw threads are in said predetermined position, said first portion being of a length at least as long as said longitudinally extending spaces, and a second longitudinally extending portion spaced in a circumferential direction from said first portion and extending in an axial direction beyond said first portion and in which said anvil is in registry when said members are moved in a direction axially away from each other beyond a position where the screw threads are interengageable said channel being continuous from said first and second portions.

References Cited in the file of this patent

UNITED STATES PATENTS

| | | |
|---|---|---|
| 1,885,043 | Beck | Oct. 25, 1932 |
| 2,026,931 | Burns et al. | Jan. 7, 1936 |
| 2,059,540 | Stephan | Nov. 3, 1936 |
| 2,096,135 | Raymond | Oct. 19, 1937 |
| 2,158,406 | Collett et al. | May 16, 1939 |
| 2,474,459 | Beck | June 28, 1949 |